United States Patent [19]

Dauth et al.

[11] Patent Number: 6,040,383
[45] Date of Patent: Mar. 21, 2000

[54] ORGANOSILICON COMPOUNDS CONTAINING OLIGOISOBUTYLENE OR POLYISOBUTYLENE GROUPS

[75] Inventors: Jochen Dauth; Thomas Hierstetter; Bernward Deubzer, all of Burghausen; Petra Gratzl, Tuessling, all of Germany

[73] Assignee: Wacker-Chemie GmbH, Munich, Germany

[21] Appl. No.: 09/052,508

[22] Filed: Mar. 31, 1998

[30] Foreign Application Priority Data

Apr. 14, 1997 [DE] Germany ............... 197 15 513

[51] Int. Cl.$^7$ ............... C08F 8/00; C08L 43/00
[52] U.S. Cl. ............ 525/100; 525/101; 525/326.5; 524/806; 524/837; 526/279; 528/15; 528/17; 528/18; 528/26; 528/31; 528/32
[58] Field of Search ........... 524/806, 837; 525/100, 101; 526/279; 528/15, 31, 32, 17, 18

[56] References Cited

U.S. PATENT DOCUMENTS

| | | |
|---|---|---|
| 3,855,174 | 12/1974 | Brie et al. . |
| 4,725,648 | 2/1988 | Fujimoto et al. .............. 525/100 |
| 5,731,379 | 3/1998 | Kennan et al. .............. 524/806 |

FOREIGN PATENT DOCUMENTS

| | | |
|---|---|---|
| 0252372 | 1/1988 | European Pat. Off. . |
| 0320259 | 6/1989 | European Pat. Off. . |

*Primary Examiner*—James O. Wilson
*Assistant Examiner*—Howard Owens
*Attorney, Agent, or Firm*—Brooks & Kushman P.C.

[57] ABSTRACT

The invention describes novel organosilicon compounds containing oligoisobutylene or polyisobutylene groups and comprising at least one unit of the formula $$A_a R_b SiX_c O_{4-(a+b+c)/2}, \quad (I)$$

where R are identical or different and are each a monovalent, divalent or trivalent unsubstituted or substituted hydrocarbon radical, X are identical or different and are each a chlorine atom or a radical of the formula —OR$^1$, where R$^1$ is a hydrogen atom or an alkyl radical which may be substituted by an ether oxygen atom, or a radical of the formula $$-R^2([OCH(CH_3)CH_2]_e[OCH_2CH_2]_f[O(CH_2)_4]_g OR^3)_y, \quad (II)$$

where R$^2$ is a divalent or trivalent, unsubstituted or substituted hydrocarbon radical which is substituted by one or more groups of the formulae $$-(C=O)-O-, -(C=O)-NR^3-, -NR^3-, -O-, -S-,$$

R$^3$ is a hydrogen atom or R$^1$ or a radical of the formula $$-(C=O)-R^1,$$

e, f and g are each an integer of 0–200, with the proviso that the sum $e+f+g \geq 1$ and y is 1 or 2, a is 0, 1 or 2, b is 0, 1, 2 or 3, c is 0, 1, 2 or 3 and the sum $a+b+c \leq 4$, and A is a radical which contains an oligoisobutylene or polyisobutylene group, with the proviso that at least one radical of the formula A is present per molecule.

14 Claims, No Drawings

ORGANOSILICON COMPOUNDS CONTAINING OLIGOISOBUTYLENE OR POLYISOBUTYLENE GROUPS

TECHNICAL FIELD

The invention relates to organosilicon compounds containing oligoisobutylene or polyisobutylene groups, a process for their preparation, a process for their equilibration and coating processes using these compounds.

DESCRIPTION OF THE RELATED ART

Formulations containing polyorganosiloxanes and polyisobutylene are widely known. Examples are U.S. Pat. No. 3,855,174 and U.S. Pat. No. 4,725,648.

It is an object of the invention to provide new organosilicon compounds containing bound oligoisobutylene or polyisobutylene groups, which can be prepared in a simple process using readily available starting materials; which are hydrophobic and resistant to detergents; and which have structures which can be built up in a targeted way. No transition metal catalyst, e.g. hydrosilylation catalysts, should be used in their preparation. The organosilicon compounds of the invention should also be able to be made hydrophilic, reactive, or crosslinkable, and should have, in particular, excellent properties as polishes. These and other objects are achieved by the invention.

SUMMARY OF THE INVENTION

The invention provides organosilicon compounds containing oligoisobutylene or polyisobutylene groups and comprise at least one unit of the formula $$A_a R_b SiX_c O_{4-(a+b+c)/2},  \quad (I)$$

where R are identical or different and are each a monovalent, divalent, or trivalent unsubstituted or substituted hydrocarbon radical preferably having from 1 to 3600 carbon atom(s) per radical, X are identical or different and are each a chlorine atom or a radical of the formula $-OR^1$, where $R^1$ is a hydrogen atom or an alkyl radical, preferably alkyl having from 1 to 8 carbon atom(s) per radical, which may be substituted by an ether oxygen atom, or a radical of the formula $$-R^2([OCH(CH_3)CH_2]_e[OCH_2CH_2]_f[O(CH_2)_4]_g OR^3)_y,  \quad (II)$$

where the radicals ([OCH (CH$_3$)CH$_2$]$_e$, [OCH$_2$CH$_2$]$_f$ and [O(CH$_2$)$_4$]$_g$ can occur mixed in any order, where $R^2$ is a divalent or trivalent, unsubstituted or substituted hydrocarbon radical preferably having from 2 to 50 carbon atom(s) per radical, which is substituted by one or more groups of the formulae $$-(C=O)-O-, -(C=O)-NR^3-, -NR^3-, -O-, -S-,$$

where $-(C=O)-O-$, $-NR^3-$ and $-O-$ are particularly preferred, $R^3$ is a hydrogen atom or $R^1$ or a radical of the formula $-(C=O)-R^1$, e, f and g are each an integer of preferably 0–200, preferably 1–50 and particularly preferably 5–30, with the proviso that the sum $e+f+g \geq 1$ and y is 1 or 2, a is 0, 1 or 2, b is 0, 1, 2 or 3, c is 0, 1, 2 or 3 and the sum $a+b+c \leq 4$, where preferred examples of formula (II) are:

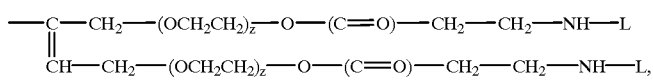

L=—CH$_2$—CH$_2$—(OCH$_2$CH$_2$)$_{100-200}$—OCH$_3$,
—CH(—CH$_3$)—CH$_2$—(OCH$_2$CH$_2$)$_{9-13}$—OCH$_3$,
—CH(—CH$_3$)—CH$_2$—(OCH$_2$CH(—CH$_3$))$_{8-10}$—OCH$_2$CH$_2$OCH$_3$,
—CH$_2$—CH$_2$—(O(CH$_2$)$_4$)$_{15-17}$—OH, z is zero or a number from 1 to 20 and A is a radical which contains an oligoisobutylene or polyisobutylene group, with the proviso that at least one radical of the formula A is present per molecule.

A is preferably a radical of the formula

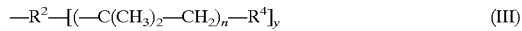

or

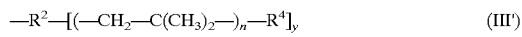

where $R^2$ is as defined above, $R^4$ is a hydrogen atom, a hydrocarbon radical or a radical of the formulae $-(C=O)-R^1$, $-O-R^1$, $-O-(C=O)-R^1$ and n is a number from 1 to 500, y is 1 or 2, with the proviso that at least one radical of the formula A is present per molecule.

The invention further provides a process for preparing organosilicon compounds containing oligoisobutylene or polyisobutylene groups, which comprises reacting an organosilicon compound comprising at least one unit of the formula $$E_a R_b SiX_c O_{4-(a+b+c)/2},  \quad (IV)$$

where R, X, a, b and c are as defined above and E is a radical of the formulae $$-R^2-(NR^1-CH_2-CH_2)_d-NR^1{}_2, -R^2-SH, -R^2-(Z-(C=O)-(C-R^5)=CH_2)_y,$$

where $R^2$ and $R^1$ are as defined above, Z is a radical of the formula $-O-$ or $NR^3$, d is 0 or an integer from 1 to 8, y is 1 or 2, and $R^5$ is a hydrogen atom or a methyl group, with the proviso that at least one unit of the formula E is present per molecule, with an oligoisobutylene or polyisobutylene of the formula $$H_2N-R_h{}^6-(CH_2-C(CH_3)_2)_n-R^4, HS-R_h{}^6-(CH_2-C(CH_3)_2)_n-R^4,$$

$$H_2N-R_h{}^6-(-C(CH_3)_2-CH_2-)_n-R^4, HS-R_h{}^6-(-C(CH_3)_2-CH_2-)_n-R^4,$$

$$H_2C=(C-R^5)-(C=O)-Z-R_h{}^6-(-C(CH_3)_2-CH_2-)_n-R^4,$$

$$H_2C=(C-R^5)-(C=O)-Z-R_h{}^6-(CH_2-C(CH_3)_2-)_n-R^4, \quad (V)$$

where $R^4$ is as defined above; n=a number from 1 to 500, $R^5$, Z and n are as defined above, $R^6$ is a substituted or unsubstituted hydrocarbon radical having 1–8 carbon atoms, which may be interrupted by a group of the formula —(C=O)— and h is 0 or 1, in bulk, solution or emulsion.

Examples of radicals R are alkyl radicals such as the methyl, ethyl, n-propyl, iso-propyl, 1-n-butyl, 2-n-butyl, iso-butyl, tert-butyl, n-pentyl, iso-pentyl, neo-pentyl or tert-pentyl radical; hexyl radicals such as the n-hexyl radical; heptyl radicals such as the n-heptyl radical; octyl radicals such as the n-octyl radical and iso-octyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl or cycloheptyl radical and methylcyclohexyl radicals; aryl radicals such as the phenyl, naphthyl, anthryl or phenanthryl radical; alkaryl radicals such as o-, m-, p-tolyl radicals; xylyl radicals and ethylphenyl radicals; and aralkyl radicals such as the benzyl or phenylethyl radical. Preference is given to the methyl radical, the n-octyl radical, the n-dodecyl radical and the n-octadecyl radical.

Examples of halogenated radicals R are haloalkyl radicals such as the 3,3,3-trifluoro-n-propyl radical, the 2,2,2,2',2', Examples of radicals $R^2$ are substituted alkyl radicals of the formulae

—(CH$_2$)$_3$—[(C$_6$H$_3$)—(OCH$_3$)]—O—(C=O)—CH$_2$—CH$_2$—NH—,

—(CH$_2$)$_3$—O—(C=O)—CH$_2$—CH$_2$—NH—,

—(CH$_2$)$_6$—O—(C=O)CH$_2$—CH$_2$—NH—,

—CH=CH—CH$_2$—(—O—CH$_2$—CH$_2$)$_z$—O—(C=O)—CH$_2$—CH$_2$—NH—

—(CH$_2$)$_3$—O—CH$_2$—CH(—OH)—CH$_2$—O—(C=O)—CH$_2$—CH$_2$—NH—

—(CH$_2$)$_3$—O—CH$_2$—CH(—CH$_2$—OH)—O—(C=O)—CH$_2$—CH$_2$—NH—

—(CH$_2$)$_3$—O—CH$_2$—CH(—CH$_2$—O—(C=O)—CH$_2$—CH$_2$—NH—)—O—(C=O)—CH$_2$—CH$_2$—NH—,

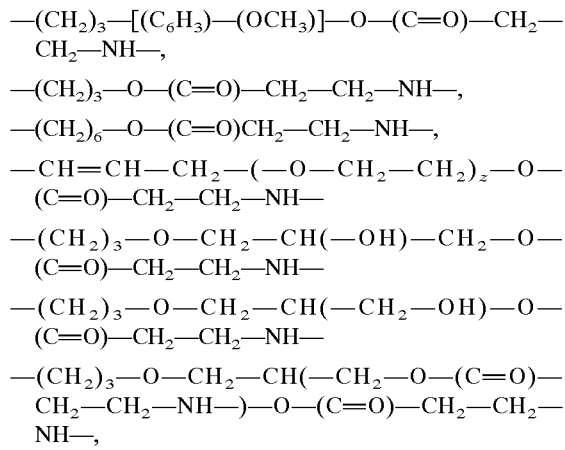

2'-hexafluoroisopropyl radical, the heptafluoroisopropyl radical and haloaryl radicals such as the o-, m- and p-chlorophenyl radicals.

Particularly preferred radicals R are:

—(CH$_2$)$_3$—SH,

—(CH$_2$)$_3$—NH$_2$,

—(CH$_2$)$_3$—NH—CH$_2$—CH$_2$—NH$_2$,

—(CH$_2$)$_3$—NH$_3$$^+$Y$^-$, where Y is Cl$^-$, HSO$^-$$_3$, HCOO$^-$, CH$_3$COO$^-$,

—(CH$_2$)$_3$—NH$_3$$^+$(Y$^-$)—CH$_2$—CH$_2$—NH$_3$$^{30}$ (Y$^-$),

—(CH$_2$)$_3$—NH—(C=O)—CH$_3$

—(CH$_2$)$_3$—N—((C=O)—CH$_3$)—CH$_2$—CH$_2$—NH—(C=O)—CH$_3$

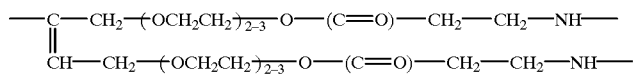

Examples of alkyl radicals $R^1$ are methyl, ethyl, n-propyl, iso-propyl, 1-n-butyl, 2-n-butyl, isobutyl- and tert-butyl radicals. Preference is given to the methyl and ethyl radicals. Examples of alkyl radicals $R^1$ which are substituted by an ether oxygen atom are the methoxyethyl and ethoxyethyl radicals.

The radical $R^1$ is preferably a hydrogen atom, a methyl, ethyl, butyl or cyclohexyl group.

n is preferably from 1 to 100, particularly preferably from 5 to 50.

z is preferably from 0 to 15, particularly preferably from 1 to 10.

Preferred radicals $R^2$ are those of the formula

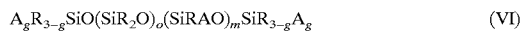

The radical $R^3$ is preferably a hydrogen atom, a methyl or butyl group.

Preferred organosilicon compounds containing oligo-isobutylene or polyisobutylene groups are those of the formula $$A_gR_{3-g}SiO(SiR_2O)_o(SiRAO)_mSiR_{3-g}A_g \qquad (VI)$$

where A and R are as defined above, g is 0.1 or 2, m and o are 0 or an integer from 1 to 1000, with the proviso that at least one radical A is present per molecule in a terminal or lateral position. The radicals (SiR$_2$O)$_o$ and (SiRAO)$_m$ can occur mixed in any order.

The organosilicon compounds of the invention preferably have an average molecular weight of from 500 to 1,000,000 g/mol, preferably from 5000 to 150,000 g/mol, and preferably have a viscosity of from 10 to 1,000,000 mm$^2$.s$^{-1}$ at 25° C., preferably from 20 to 100,000 mm$^2$.s$^{-1}$ at 25° C.

The organosilicon compounds of the invention can also be wax-like or solid.

The organosilicon compounds used in the process of the invention are preferably those of the formula $$E_gR_{3-g}SiO(SiR_2O)_o(SiREO)_mSiR_{3-g}E_g \quad (VII)$$

where R, E, g, o and m are as defined above and $(SiR_2O)_o$ and $(SiREO)_m$ can occur mixed in any order.

In the process of the invention, it is possible to use compounds known from the literature which catalyze reactions similar to the Michael reaction.

Examples are glacial acetic acid, tin(IV) chloride, sodium methoxide and alkali metal amides, which can be used in amounts of from 0.1 to 2% by weight of the total weight of the starting materials.

Furthermore, free-radical initiators in the reaction of mercaptans, for example azo compounds and/or peroxo compounds, can be added as catalysts in amounts of 0.1 to 5% by weight.

In the process of the invention, preference is given to using 0.001–10 mol, preferably 0.01–3 mol and particularly preferably 0.1–2 mol, of compound of the formula (V) per mol of the radical E in the organosilicon compound (IV).

In the process of the invention, unreacted radicals E in the organosilicon compound (IV) can be reacted further with alkoxylated amines or acrylates to make the organosilicon compounds of the invention hydrophilic.

In the process of the invention, it is possible to use organic solvents or water or mixtures of the two. Examples of organic solvents are toluene, xylene, tetrahydrofuran (THF), n-butyl acetate, isopropanol and dimethoxyethane. Organic solvents used are preferably removed after the reaction.

The process of the invention is preferably carried out at the pressure of the surrounding atmosphere, i.e. at about 1020 hPa (abs.). However, it can also be carried out at higher or lower pressures. Furthermore, the process of the invention is preferably carried out at a temperature of from 25° C. to 150° C., preferably from 25° C. to 120° C., particularly preferably from 25° C. to 100° C.

The reaction of acrylated organosilicon compounds with monoaminated polyisobutylene is preferred.

If the monoaminated oligoisobutylene or polyisobutylene is used in a substoichiometric amount based on the (meth)acrylate groups, the organosilicon compounds of the invention can be crosslinked via the remaining (meth)acrylate groups by a free-radical mechanism or via a hydrosilylation.

Remaining amine groups can be acylated or neutralized after the reaction.

The organopolysiloxanes containing oligoisobutylene or polyisobutylene groups and obtained by the process of the invention can be equilibrated with organopolysiloxanes selected from the group consisting of linear organopolysiloxanes having terminal triorganosiloxy groups, linear organopolysiloxanes having terminal hydroxyl groups, cyclic organopolysiloxanes and copolymers of diorganosiloxane and monoorganosiloxane units.

As linear organopolysiloxanes having terminal triorganosiloxy groups, preference is given to using those of the formula $$R_3SiO(SiR_2O)_rSiR_3,$$

where R is as defined above and r is 0 or an integer from 1 to 1500; as linear organopolysiloxanes having terminal hydroxyl groups, preference is given to using those of the formula $$HO(SiR_2O)_sH,$$

where R is as defined above and s is an integer from 1 to 1500; as cyclic organopolysiloxanes, preference is given to using those of the formula $$(R_2SiO)_t,$$

where R is as defined above and t is an integer from 3 to 12; and as copolymers, preference is given to using those comprising units of the formula $$R_2SiO \text{ and } RSiO_{3/2},$$

where R is as defined above.

The ratios of the organopolysiloxanes and the organopolysiloxanes containing oligoisobutylene or polyisobutylene groups used in the equilibration which may be carried out are determined only by the desired proportion of the oligoisobutylene or polyisobutylene groups in the organopolysiloxanes produced in the equilibration which may be carried out and by the desired mean chain length.

In the equilibration which may be carried out, use is made of acidic or basic catalysts which promote the equilibration. Examples of acidic catalysts are sulfuric acid, phosphoric acid, trifluoromethanesulfonic acid, phosphonitrilic chlorides and acidic catalysts which are solid under the reaction conditions, for example acidic-activated bleaching earth, acidic zeolites, sulfonated coal and sulfonated styrene-divinylbenzene copolymers. Preference is given to phosphonitrilic chlorides. Phosphonitrilic chlorides are preferably used in amounts of from 5 to 1000 ppm (parts per million) by weight, in particular from 50 to 200 ppm by weight, in each case based on the total weight of the organosilicon compounds used. Examples of basic catalysts are benzyltrimethylammonium hydroxide, tetramethylammonium hydroxide, alkali metal hydroxides, alkaline earth metal hydroxides in methanolic solution, phosphonium hydroxides and silanolates. Preference is given to alkali metal hydroxides which are used in amounts of from 50 to 10,000 ppm by weight, in particular from 500 to 2000 ppm, in each case based on the total weight of the organosilicon compounds used.

The equilibration which may be carried out is preferably carried out at from 80° C. to 150° C. and at the pressure of the surrounding atmosphere, i.e. at about 1020 hPa (abs.). However, higher or lower pressures can also be employed if desired. The equilibration is preferably carried out in from 5 to 20% by weight, based on the total weight of the organosilicon compounds respectively used, of a water-immiscible solvent such as toluene.

Before the work-up of the mixture obtained in the equilibration, the catalyst can be made inactive.

The novel organosilicon compounds containing oligoisobutylene or polyisobutylene groups are simple to prepare and can be made to have a targeted degree of hydrophobicity. If the monoaminated polyisobutylenes are used in a substoichiometric amount based on the acrylate groups, free acrylate groups remain in the silicone oil and these can then be reacted with monoaminated polyoxyalkylenes in a second step.

Varying the ratio of polyisobutylenes to polyoxyalkylenes gives amphiphylic block copolymers having a degree of hydrophilicity or hydrophobicity which can be set exactly (see Example 6). Apart from the hydrophobicity, the copolymers of the invention have a good soft feel and a low tendency to yellowing. Furthermore, they are resistant to detergents.

The above-mentioned organosilicon compounds of the invention are preferably used in the treatment of flat textile structures, for example woven fabrics, knitteds or nonwovens. The invention further relates to textile fiber treatment and leather treatment. Furthermore, the compounds of the invention can be used in the cosmetics, household cleaners, polishes, surface coatings and building industries. They also serve as compatibilizers for organosilicon compounds and organic rubbers. In addition, the compounds of the invention serve as additives for hair sprays, as thread lubricants, as coatings for woven fabrics and as polishes, preferably for stoves.

EXAMPLE 1

13 g ($2.8 \cdot 10^{-2}$ mol of C=C) of a diacrylate-terminated polydimethylsiloxane having a mean chain length of 13, an iodine number of 54.5 g of iodine per 100 g of oil and a viscosity of 82 mm²/s at 25° C. are stirred at 100° C. with 86.7 g ($2.8 \cdot 10^{-2}$ mol $NH_2$) of a 50% strength by weight solution of a monoaminated polyisobutylene having a mean chain length of 17 in a $C_{13}$ paraffin (KEROKOM PIBA; from BASF), having an amine number of 0.322 mmol of amine/g of solution, for 2 hours.

After filtration, the reaction mixture is evaporated to constant weight in a high vacuum (1 mbar) at 120° C. This gives 54.95 g (97.5% of theory) of a clear, yellow oil having a viscosity of 30,700 mm²/s at 25° C.

EXAMPLE 2

40 g ($1.89 \cdot 10^{-2}$ mol of C=C) of a diacrylate-terminated polydimethylsiloxane having a mean chain length of 100, an iodine number of 12 g of iodine per 100 g of oil and a viscosity of 421 mm²/s at 25° C. are stirred at 100° C. with 58.7 g ($1.89 \cdot 10^{-2}$ mol $NH_2$) of a 50% strength by weight solution of a monoaminated polyisobutylene having a mean chain length of 17 in a $C_{13}$ paraffin (KEROKOM PIBA; from BASF), having an amine number of 0.322 mmol of amine/g of solution, and 40 g (0.434 mol) of toluene for 4.5 hours.

After filtration, the reaction mixture is evaporated to constant weight in a high vacuum (1 mbar) at 120° C. This gives 67.8 g (97.8% of theory) of a colorless, translucent oil having a viscosity of 25,000 mm²/s at 25° C.

EXAMPLE 3

40 g ($1.56 \cdot 10^{-2}$ mol of C=C) of a polydimethylsiloxane having a mean chain length of 180, with, on average, eight lateral acrylate groups per molecule, an iodine number of 9.9 g of iodine per 100 g of oil and a viscosity of 594 mm²/s at 25° C. are stirred at 100° C. with 48.45 g ($1.56 \cdot 10^{-2}$ mol $NH_2$) of a 50% strength by weight solution of a monoaminated polyisobutylene having a mean chain length of 17 in a $C_{13}$ paraffin (KEROKOM PIBA; from BASF), having an amine number of 0.322 mol of amine/g of solution, and 20 g (0.217 mol) of toluene for 4 hours.

After filtration, the reaction mixture is evaporated to constant weight in a high vacuum (1 mbar) at 120° C. This gives 62.8 g (97.8% of theory) of a colorless, clear oil having a viscosity of 38,600 mm²/s at 25° C.

EXAMPLE 4

Example 1 is repeated as described above, except that 43.38 g of KEROKOM PIBA (from BASF) are used instead of 86.74 g. This gives 30.77 g (87% of theory) of a clear, yellow oil having a viscosity of 4900 mm²/s at 25° C. (Copo 1).

EXAMPLE 5

10 g of Copo 1 are admixed with 3% by weight of 2,2'-azoisobutyronitrile and heated at 100° C. for 4 hours. This gives a completely crosslinked, yellow rubber.

EXAMPLE 6

40 g of the acrylate-terminated polydimethylsiloxane described in Example 2 are stirred at 100° C. with 29.37 g ($9.46 \cdot 10^{-3}$ mol of $NH_2$) of a 50% strength by weight solution of a monoaminated polyisobutylene having a mean chain length of 17 in a $C_{13}$ paraffin (KEROKOM PIBA; from BASF), having an amine number of 0.322 mmol of amine/g of solution, and 5.95 g ($9.46 \cdot 10^{-3}$ mol of amine) of a monoaminated, methyl-terminated polyethylene oxide having a mean chain length of 13 and an amine number of 1.59 mmol of amine/g of oligomer and 20 g (0.217 mol) of toluene for 4 hours.

After filtration, the reaction mixture is evaporated to constant weight in a high vacuum (1 mbar) at 120° C. This gives 67.8 g (97.8% of theory) of a colorless, translucent oil having a viscosity of 2500 mm²/s at 25° C.

EXAMPLE 7

Example 1 is repeated as described above except that 3.2 g ($3.1 \cdot 10^{-2}$ mol) of acetic anhydride are added prior to the filtration and the reaction time is increased by 1 hour. Work-up gives 55.3 g (96% of theory) of a clear brownish oil having a viscosity of 25,200 mm²/s at 25° C.

EXAMPLE 8

Comparison of an organosilicon compound according to the invention to the prior art when used as a polish.

1 g each of a 3% strength by weight solution of the product of Example 2, and of an end-stopped silicone oil (Comparison 2) built up of trimethylsiloxy, dimethylsiloxy and aminoethylaminopropylmethylsiloxy units, having a viscosity of 1000 mm²/s at 25° C. and lateral amine groups (0.58 mmol of amine groups/g) in benzene were applied to a lightly soiled decorative glass ceramic plate having dimensions of 25 cm×25 cm and were distributed uniformly. The plate was subsequently polished with a moist household cloth until the surface was free of streaks.

At this point, the cleaning action and the handling fastness of the protective film were assessed:

| | |
|---|---|
| Example 2 | good |
| Comparison 2 | average |

Subsequently, the protective action was tested by sprinkling the surface with an about 3 mm thick layer of sugar and the plate was heated until the sugar had completely caramelized or carbonized. After cooling, the adhesion of the caramelized sugar, the ease and completeness of its detachment from the surface and also the nature of the surface in respect of damage (chipping) were assessed.

| Assessment criteria | Detachment | Chipping |
|---|---|---|
| Example 2 | good | little |
| Comparison 2 | average | a lot |

What is claimed is:

1. An organosilicon compound comprising oligoisobutylene or polyisobutylene groups and comprising at least one unit of the formula

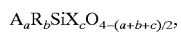

where R are identical or different and are each a monovalent, divalent or trivalent unsubstituted or substituted hydrocarbon radical, X are identical or different and are each a chlorine atom or a radical of the formula —OR$^1$, where R$^1$ is a hydrogen atom or X is an alkyl radical which may be substituted by an ether oxygen atom, or a radical of the formula $$—R^2(\{OCH(CH_3)CH_2\}_e\{OCH_2CH_2\}_f\{O(CH_2)_4\}_g OR^3)_y \qquad (II)$$

where R$^2$ is a divalent or trivalent, unsubstituted or substituted hydrocarbon radical which is substituted by one or more groups of the formulae $$—(C=O)—O—, —(C=O)—NR^3—, —NR^3—, —O—, —S—,$$

R$^3$ is R$^1$ or a radical of the formula $$—(C=O)—R^1,$$

e, f and g are each an integer of 0–200, with the proviso that the sum e+f+g$\geq$1 and y is 1 or 2, a is 0, 1 or 2, b is 0, 1, 2 or 3, c is 0, 1, 2 or 3 and the sum a+b+c$\leq$4, and A is a radical which contains an oligoisobutylene or polyisobutylene group, with the proviso that at least one radical of the formula A is present per molecule.

2. An organosilicon compound comprising oligoisobutylene or polyisobutylene groups as claimed in claim 1, wherein A is a radical of the formula $$—R^2—\{(—C(CH_3)_2—CH_2)_n—R^4\}_y \qquad (III)$$

or $$—R^2—\{(—CH_2—C(CH_3)_2—)_n—R^4\}_y \qquad (III')$$

where R$^2$ is as defined above, R$^4$ is a hydrogen atom, a hydrocarbon radical or a radical of the formula —(C=O)—R$^1$, —O—R$^1$ or —O—(C=O)—R$^1$ and n is a number from 1 to 500, y is as defined above, with the proviso that at least one radical of the formula A is present per molecule.

3. A process for preparing organosilicon compounds comprising oligoisobutylene or polyisobutylene groups, which comprises reacting a) an organosilicon compound comprising at least one unit of the formula $$E_a R_b SiX_c O_{4-(a+b+c)/2}, \qquad (IV)$$

where R are identical or different and are each a monovalent, divalent or trivalent unsubstituted or substituted hydrocarbon radical, X are identical or different and are each a chlorine atom or a radical of the formula —OR$^1$, where R$^1$ is a hydrogen atom or an alkyl radical which may be substituted by an ether oxygen atom, or X is a radical of the formula $$—R^2(\{OCH(CH_3)CH_2\}_e\{OCH_2CH_2\}_f\{O(CH_2)_4\}_g OR^3)_y \qquad (II)$$

where R$^2$ is a divalent or trivalent, unsubstituted or substituted hydrocarbon radical which is substituted by one or more groups of the formulae $$—(C=O)—O—, —(C=O)—NR^3—, —NR^3—, —O—, —S—,$$

R$^3$ is a hydrogen atom or an alkyl radical which may be substituted by an ether oxygen atom or a radical of the formula $$—(C=O)—R^1,$$

e, f and g are each an integer of 0–200, with the proviso that the sum e+f+g$\geq$1 and y is 1 or 2, a is 0, 1 or 2, b is 0, 1, 2 or 3, c is 0, 1, 2 or 3 and the sum a+b+c$\leq$4, and where each E individually is a radical of the formulae $$—R^2—(NR^1—CH_2—CH_2)_d—NR^1_2, —R^2—SH, —R^2—(Z—(C=O)—(C—R^5)=CH_2)_y,$$

where R$^2$ and R$^1$ are as defined above, Z is a radical of the formula —O— or NR$^3$, d is 0 or an integer from 1 to 8, y is as defined above and R$^5$ is a hydrogen atom or a methyl group; with the proviso that at least one unit of the formula E is present per molecule, with b) at least one oligoisobutylene or polyisobutylene of the formulae (V)

$$H_2N—R_h^6—(—C(CH_3)_2—CH_2—)_n—R^4, HS—R_h^6—(—C(CH_3)_2—CH_2—)_n—R^4$$

$$H_2C=(C—R^5)—(C=O)—Z—R_h^6—(—C(CH_3)_2—CH_2—)_n—R^4$$

$$H_2N—R_h^6—(—CH_2—C(CH_3)_2)_n—R^4, HS—R_h^6—(—CH_2—C(CH_3)_2)_n—R^4$$

$$H_2C=(C—R^5)—(C=O)—Z—R_h^6—(—CH_2—C(CH_3)_2)_n—R^4,$$

where R$^4$ is a hydrogen atom, a hydrocarbon radical or a radical of the formula —(C=O)—R$^1$, —O—R$^1$ or —O—(C=O)—R$^1$ and n is a number from 1 to 500, where R$^5$ and Z are as defined above, R$^6$ is a hydrocarbon radical which is substituted or unsubstituted and may be interrupted by a group of the formula —(C=O)— and h is 0 or 1, in bulk, solution or emulsion.

4. The process as claimed in claim 3, wherein the organosilicon compounds comprising oligoisobutylene or polyisobutylene groups can be crosslinked via remaining unreacted unsaturated groups by a free-radical mechanism, by means of a Michael type reaction, or by a hydrosilylation reaction.

5. The process as claimed in claim 4 wherein said unreacted unsaturated groups comprise (meth)acrylate groups.

6. A process for equilibrating organosilicon compounds comprising oligoisobutylene or polyisobutylene groups as claimed in claim 1, which comprises equilibrating them with organopolysiloxanes selected from the group consisting of linear organopolysiloxanes having terminal triorganosiloxy groups, linear organopolysiloxanes having terminal hydroxyl groups, cyclic organopolysiloxanes and copolymers of diorganosiloxane and monoorganosiloxane units.

7. A process for equilibrating organosilicon compounds comprising oligoisobutylene or polyisobutylene groups as claimed in claim 2, which comprises equilibrating them with organopolysiloxanes selected from the group consisting of linear organopolysiloxanes having terminal triorganosiloxy groups, linear organopolysiloxanes having terminal hydroxyl groups, cyclic organopolysiloxanes and copolymers of diorganosiloxane and monoorganosiloxane units.

8. A process for equilibrating organosilicon compounds comprising oligoisobutylene or polyisobutylene groups prepared by the process of claim 3, which comprises equilibrating them with organopolysiloxanes selected from the group consisting of linear organopolysiloxanes having terminal triorganosiloxy groups, linear organopolysiloxanes having terminal hydroxyl groups, cyclic organopolysiloxanes and copolymers of diorganosiloxane and monoorganosiloxane units.

9. A process for equilibrating organosilicon compounds comprising oligoisobutylene or polyisobutylene groups prepared by the process of claim 4, which comprises equilibrating them with organopolysiloxanes selected from the group consisting of linear organopolysiloxanes having terminal triorganosiloxy groups, linear organopolysiloxanes having terminal hydroxyl groups, cyclic organopolysiloxanes and copolymers of diorganosiloxane and monoorganosiloxane units.

10. A coating process which comprises applying the organosilicon compounds comprising oligoisobutylene or polyisobutylene groups as claimed in claim 1 as a coating onto a substrate.

11. A coating process which comprises applying the organosilicon compounds comprising oligoisobutylene or polyisobutylene groups as claimed in claim 2 as a coating onto a substrate.

12. A coating process which comprises applying the organosilicon compounds comprising oligoisobutylene or polyisobutylene groups prepared by the process of claim 3 as a coating onto a substrate.

13. A coating process which comprises applying the organosilicon compounds comprising oligoisobutylene or polyisobutylene groups prepared by the process of claim 4 as a coating onto a substrate.

14. A coating process which comprises applying the organosilicon compounds comprising oligoisobutylene or polyisobutylene groups prepared by the process of claim 5 as a coating onto a substrate.

* * * * *